United States Patent
Meruva et al.

(10) Patent No.: US 10,972,314 B2
(45) Date of Patent: Apr. 6, 2021

(54) GATEWAY DEVICE FOR A FIRE CONTROL SYSTEM

(71) Applicant: Honeywell International Inc., Morris Plains, NJ (US)

(72) Inventors: Jayaprakash Meruva, Bangalore (IN); Rajesh Babu Nalukurthy, Bangalore (IN); Vipindas E K, Kannur (IN); Amit Jain, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/451,648

(22) Filed: Jun. 25, 2019

(65) Prior Publication Data

US 2020/0412580 A1   Dec. 31, 2020

(51) Int. Cl.
*H04L 12/66* (2006.01)
*H04L 12/26* (2006.01)
(Continued)

(52) U.S. Cl.
CPC .......... *H04L 12/66* (2013.01); *H04L 41/0809* (2013.01); *H04L 41/0823* (2013.01);
(Continued)

(58) Field of Classification Search
CPC . H04L 12/66; H04L 41/5003; H04L 41/0896; H04L 41/5019; H04L 41/0823; H04L 41/0809; H04L 41/22; H04L 41/24; H04L 41/06; H04L 41/0806; H04L 47/24–2491; H04L 43/08; H04L 43/0811; H04L 67/322; H04L 67/12; H04L 67/10; H04L 67/20; H04L 49/205; H04L 49/60;
(Continued)

(56) References Cited

U.S. PATENT DOCUMENTS

| 7,929,430 B2 | 4/2011 | Oh et al. |
| 8,055,802 B2 * | 11/2011 | Choi ............ H04L 12/2836 709/249 |

(Continued)

FOREIGN PATENT DOCUMENTS

| CN | 1710619 A | 12/2005 |
| CN | 104580370 A | 4/2015 |

OTHER PUBLICATIONS

N. Aljeri, K. Abrougui, M. Almulla and A. Boukerche, "A Performance Evaluation of Load Balancing and QoS-aware Gateway Discovery Protocol for VANETs," 2013 27th International Conference on Advanced Information Networking and Applications Workshops, Barcelona, 2013, pp. 90-94. (Year: 2013).*

(Continued)

*Primary Examiner* — Joshua Kading
(74) *Attorney, Agent, or Firm* — Brooks, Cameron & Huebsch, PLLC (57) ABSTRACT

A gateway device for a fire control system is described herein. The gateway device can comprise a processor and a memory having instructions stored thereon which, when executed by the processor, cause the processor to detect that a network interface of the gateway device is connected to a network, receive data associated with the fire control system, and determine a data management scheme for the gateway device based on the type of detected network interface and the received data.

20 Claims, 5 Drawing Sheets

(51) Int. Cl.
| | | |
|---|---|---|
| *H04L 29/08* | (2006.01) | |
| *H04L 12/24* | (2006.01) | |
| *H04W 28/24* | (2009.01) | |
| *H04L 29/06* | (2006.01) | |
| *H04L 12/931* | (2013.01) | |
| *H04L 12/851* | (2013.01) | |
| *H04W 4/33* | (2018.01) | |
| *H04W 4/50* | (2018.01) | |
| *H04W 88/16* | (2009.01) | |
| *H04W 92/06* | (2009.01) | |
| *H04W 4/90* | (2018.01) | |
| *H04W 84/22* | (2009.01) | |
| *H04W 4/60* | (2018.01) | |

(52) U.S. Cl.
CPC ...... *H04L 41/0896* (2013.01); *H04L 41/5003* (2013.01); *H04L 41/5019* (2013.01); *H04L 43/08* (2013.01); *H04L 43/0811* (2013.01); *H04L 47/24* (2013.01); *H04L 49/205* (2013.01); *H04L 65/102* (2013.01); *H04L 67/12* (2013.01); *H04L 67/322* (2013.01); *H04W 4/33* (2018.02); *H04W 4/50* (2018.02); *H04W 28/24* (2013.01); *H04L 41/22* (2013.01); *H04L 41/24* (2013.01); *H04L 49/60* (2013.01); *H04L 67/10* (2013.01); *H04W 4/60* (2018.02); *H04W 4/90* (2018.02); *H04W 84/22* (2013.01); *H04W 88/16* (2013.01); *H04W 92/06* (2013.01)

(58) Field of Classification Search
CPC ....... H04L 65/102; H04L 65/40; H04L 65/80; H04W 4/33; H04W 4/50; H04W 4/90; H04W 4/60; H04W 4/30; H04W 4/38; H04W 4/80; H04W 28/0967–0992; H04W 28/16; H04W 28/24; H04W 92/06; H04W 88/16; H04W 84/22; H04W 12/00; H04W 12/009; H04W 8/18; H04W 72/0493

See application file for complete search history.

(56) References Cited

U.S. PATENT DOCUMENTS

| | | |
|---|---|---|
| 10,084,868 B2 | 9/2018 | Chandra et al. |
| 10,679,491 B1* | 6/2020 | Nalukurthy ............ G08B 17/00 |
| 2013/0343202 A1* | 12/2013 | Huseth .............. H04W 52/0296 370/244 |
| 2014/0204954 A1 | 7/2014 | Nee |
| 2016/0050264 A1 | 2/2016 | Breed et al. |
| 2019/0268307 A1* | 8/2019 | Lancioni ............. H04L 63/0281 |
| 2020/0044876 A1* | 2/2020 | Piccolo, III ......... H04L 12/2803 |

OTHER PUBLICATIONS

V. Oberoi and Chunxiao Chigan, "Providing QoS for sensor enabled emergency applications," IEEE International Conference on Mobile Adhoc and Sensor Systems Conference, 2005., Washington, DC, 2005, pp. 3 pp. 159. (Year: 2005).*

C. Subramaniam, J. Gokulakrishnan, J. K. J. D and M. B. U, "Network Virtualization for Emergency Management Services," 2010 International Conference on Multimedia Communications, Hong Kong, 2010, pp. 67-70. (Year: 2010).*

Astika Saputra, et al.. "Prototype of Early Fire Detection System for Home Monitoring Based on Wireless Sensor Mode", 2017 International Electronics Symposium on Engineering Technology and Applications, 2017 IEEE, pp. 39-44.

Extended European Search Report for related European Application No. 20181768.1 dated Oct. 30, 2020 (10 pgs).

* cited by examiner

| Runtime/Designtime/ Subscribed services | Features | Priority | Frequency | | |
|---|---|---|---|---|---|
| | | | Normal | Optimal | Lowest |
| Commissioning Time | | | | | |
| | Device Configuration Details | Medium | Allow | Export/Import | None |
| | Gateway Configuration | Very Low | Allow | Allow params-a, b,c | None |
| Inspection manager Runtime | Events | High | Allow | Allow | Transfer min properties |
| Runtime Facility Manager | Alarms & Events | High | Allow | Allow | Transfer min properties |
| | Device Obscuration&sensitivity Query | High | Collect All As is | Once in a day differential | Once in two days differential |
| Common things Runtime | Heartbeat | High | 5 sec | 1 Min | 5 min |
| | Firmware upgrade | Low | Auto | Notify, Manual | Never |
| Remote Diagnostics | Upload events/logs | Medium | All | Only Failures | None |

GATEWAY DEVICE FOR A FIRE CONTROL SYSTEM

TECHNICAL FIELD

The present disclosure relates generally to a gateway device for a fire control system.

BACKGROUND

Large facilities (e.g., buildings), such as commercial facilities, office buildings, hospitals, and the like, may have fire control systems that can be used to prevent a fire from occurring in a facility, and/or to detect and/or manage a fire occurring in the facility. A fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a physical fire control panel (e.g., box) installed in the facility that can be used by a user to directly control the operation of the components of the fire control system.

A gateway device may be used by a user (e.g., maintenance technician or operator) to perform inspections, maintenance, and/or upgrades, among other operations, on a fire control system (e.g., on the components of the fire control system) of a facility. For instance, the user may connect the gateway device to the fire control panel of the fire control system, and the gateway device can use a communication protocol to communicate with the fire control panel to perform the tasks of the operation.

DETAILED DESCRIPTION

A gateway device for a fire control system is described herein. For example, the gateway device can comprise a processor and a memory having instructions stored thereon which, when executed by the processor, cause the processor to detect a network interface of the gateway device is connected to a network, receive data associated with the fire control system, and determine a data management scheme for the gateway device based on the type of detected network interface and the received data.

Previous gateway devices for fire control systems may only be usable with certain interfaces. For instance, previous gateway devices may include only one type of physical (e.g. hardware) interface, and hence may only be connectable to a fire control panel or external cloud service using that type of interface. For instance, previous gateway devices only support interfaces such as public switched telephone network (PSTN) and Ethernet, but not long-term evolution (LTE).

As such, a user (e.g., maintenance technician or operator) who is performing operations, such as an inspections, maintenance, and/or upgrades, on fire control systems of different facilities (e.g., on the components of the fire control system) using previous gateway devices may not be able utilize cellular connectivity (e.g., 4G/LTE) to connect to a cloud to make use of various cloud services needed to carry multiple types of gateway devices. Further, various cloud services may have different bandwidth requirements to exchange data between the gateway and the external cloud. Internet bandwidth on a cellular network (e.g., mobile data), which utilized cellular connectivity, may be limited and/or costlier than an ethernet/telephone based broadband connection.

In contrast, a gateway device in accordance with the present disclosure is usable with (e.g., provides plug and play functionality for) an interface that utilizes cellular connectivity to transmit data. For instance, a gateway device in accordance with the present disclosure is capable of communicating with external cloud services via a cellular connection. Additionally, a gateway device in accordance with the present disclosure is capable of determining how to utilize a bandwidth based on cloud services a user has subscribed to and/or the type of interface the gateway device and external cloud is communicating through. As such, a gateway device in accordance with the present disclosure can determine a data management scheme based on the network interface type and received data associated with the subscribed-to cloud services for the fire control system, where the data management scheme describes how bandwidth is utilized for a particular feature of a cloud service, while ensuring quality of service (QoS) for the subscribed-to cloud services.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 101 may reference element "01" in FIG. 1, and a similar element may be referenced as 201 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component. Additionally, the designator "N" as used herein, particularly with respect to reference numerals in the drawings, indicates that a number of the particular feature so designated can be included with a number of embodiments of the present disclosure. This number may be the same or different between designations.

Figure 1:
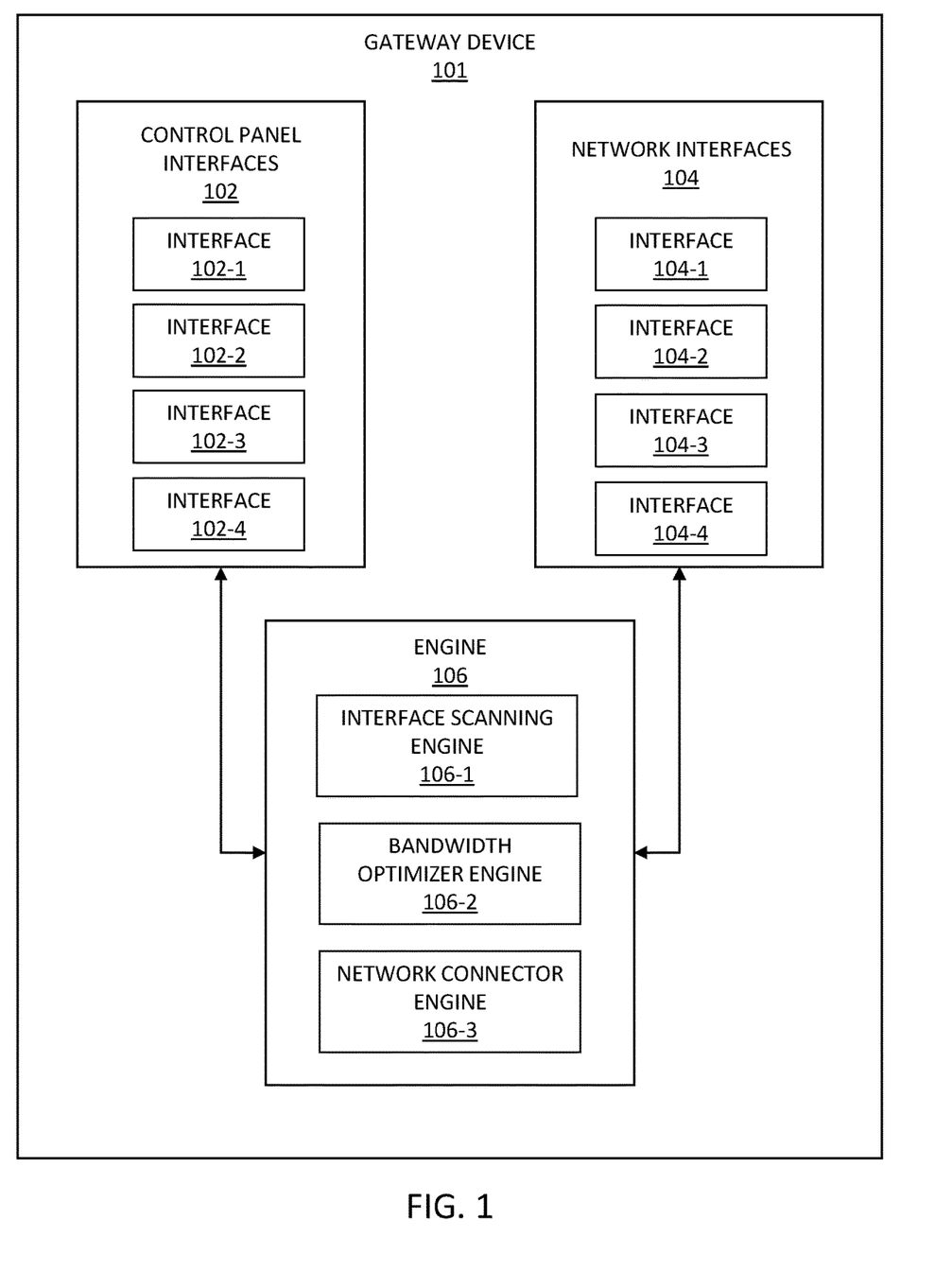
FIG. 1 illustrates an example of a gateway device for a fire control system in accordance with an embodiment of the present disclosure.

FIG. 1 illustrates an example of a gateway device 101 for a fire control system in accordance with an embodiment of the present disclosure. The fire control system can be the fire control system of a facility (e.g., building), such as, for instance, a large facility having a large number of floors, such as a commercial facility, office building, hospital, and the like. However, embodiments of the present disclosure are not limited to a particular type of facility.

Gateway device 101 may be used by a user (e.g., maintenance technician or operator) to perform inspections, maintenance, and/or upgrades, among other operations, on the fire control system (e.g., on the components of the fire control system), as will be further described herein. As an additional example, gateway device 101 may be permanently installed and/or connected at the facility, such that it can continuously send (e.g., push) data to a centralized server for detection of anomalies or other issues in the fire control system of the facility.

As shown in FIG. 1, gateway device 101 can include a plurality of control panel interfaces 102-1, 102-2, 102-3, 102-4, which may be referred to collectively herein as control panel interfaces 102. Although four control panel interfaces 102 are shown in the example illustrated in FIG. 1, embodiments of the present disclosure are not limited to a particular number of control panel interfaces.

Each respective one of the control panel interfaces 102 can be a different type of physical (e.g., hardware) interface that is connectable to a fire control panel (e.g., to a corresponding physical interface of the fire control panel) of a fire control system (e.g., interface 102-1 can be a first type of physical interface, interface 102-2 can be a second type of physical interface, etc.). For instance, in the example illustrated in FIG. 1, interface 102-1 can be an ethernet interface that is connectable to an ethernet interface of a fire control panel, interface 102-2 can be a universal serial bus (USB) interface that is connectable to a USB interface of a fire control panel, interface 102-3 can be a recommended standard (RS) interface, such as an RS-232 or RS-485 interface, that is connectable to an RS interface of a fire control panel, and interface 102-4 can be a transistor-transistor logic (TTL) interface that is connectable to a TTL interface of a fire control panel. However, embodiments of the present disclosure are not limited to a particular type(s) of physical interface.

As shown in FIG. 1, gateway device 101 can include a plurality of network interfaces 104-1, 104-2, 104-3, 104-4, which may be referred to collectively herein as network interfaces 104. Although four network interfaces 104 are shown in the example illustrated in FIG. 1, embodiments of the present disclosure are not limited to a particular number of network interfaces.

Each respective one of the network interfaces 104 can be a different type of interface that is connectable to (e.g., that can connect gateway device 101 to) a network (e.g., interface 104-1 can be a first type of network interface, interface 104-2 can be a second type of network interface, etc.). For instance, in the example illustrated in FIG. 1, interface 104-1 can be an ethernet interface, interface 104-2 can be a Wi-Fi interface, interface 104-3 can be a long-term evolution (LTE) interface, and interface 104-4 can be a public switched telephone network interface. However, embodiments of the present disclosure are not limited to a particular type(s) of network interface. An example of a network to which network interfaces 104 can connect with be further described herein (e.g., in connection with FIG. 2).

As shown in FIG. 1, gateway device 101 can include an interface scanning engine 106-1, a bandwidth optimizer engine 106-2, and a network connector engine 106-3, which may be referred to collectively herein as engine 106. Upon a powering on (e.g., a powering up and/or restart) of gateway device 101, engine 106 (e.g., interface scanning engine 106-1) can detect that one of the plurality of control panel interfaces 102 is connected to a fire control panel (e.g., to a corresponding physical interface of the fire control panel) of a fire control system of a facility. Engine 106 (e.g., network connector engine 106-1) can detect that one of the plurality of control panel interfaces 102 is connected to the fire control panel by, for instance, sequentially (e.g., one at a time) scanning each respective one of the plurality of control panel interfaces 102 for connectivity to the fire control panel, until a connectivity of one of the control panel interfaces is detected.

Additionally, upon the powering on of gateway device 101, engine 106 (e.g., network connector engine 106-3) can detect that one of the plurality of network interfaces 104 is connected to a network. Engine 106 (e.g., network connector engine 106-3) can detect that one of the plurality of network interfaces 104 is connected to the network by, for instance, sequentially (e.g., one at a time) scanning each respective one of the plurality of network interfaces 104 for connectivity to the network, until a connectivity of one of the network interfaces is detected.

Bandwidth optimizer engine 106-2 can receive data (e.g., operational data) associated with the fire control system and the type of detected network interface of gateway device 101. Based on the data associated with the fire control system and the type of detected network interface of gateway device 101, bandwidth optimizer engine 106-2 can determine a data management scheme for gateway device 101. The data management scheme can facilitate how available bandwidth is utilized by gateway device 101 for a particular feature of a subscribed-to cloud service while ensuring a quality of service (QoS) for the particular feature. In such an example, a user of the fire control system can subscribe to a number of services provided via a external cloud service. Each subscribed-to service can include a number of features which will be further described herein (e.g., in connection with FIG. 3).

Upon subscribing to the number of cloud services, a user may select a number of corresponding features associated with the cloud service, prioritize the selected features, and configure a number of behaviors (e.g., actions performed) of each of the selected features. For example, the user can manually select and prioritize the selected features via a computing device (e.g., a mobile device or desktop). Additionally, configured data corresponding to the features, such as the prioritization of each feature, can be saved in a server, which will be described herein (e.g., in connection with FIG. 2).

Figure 2:
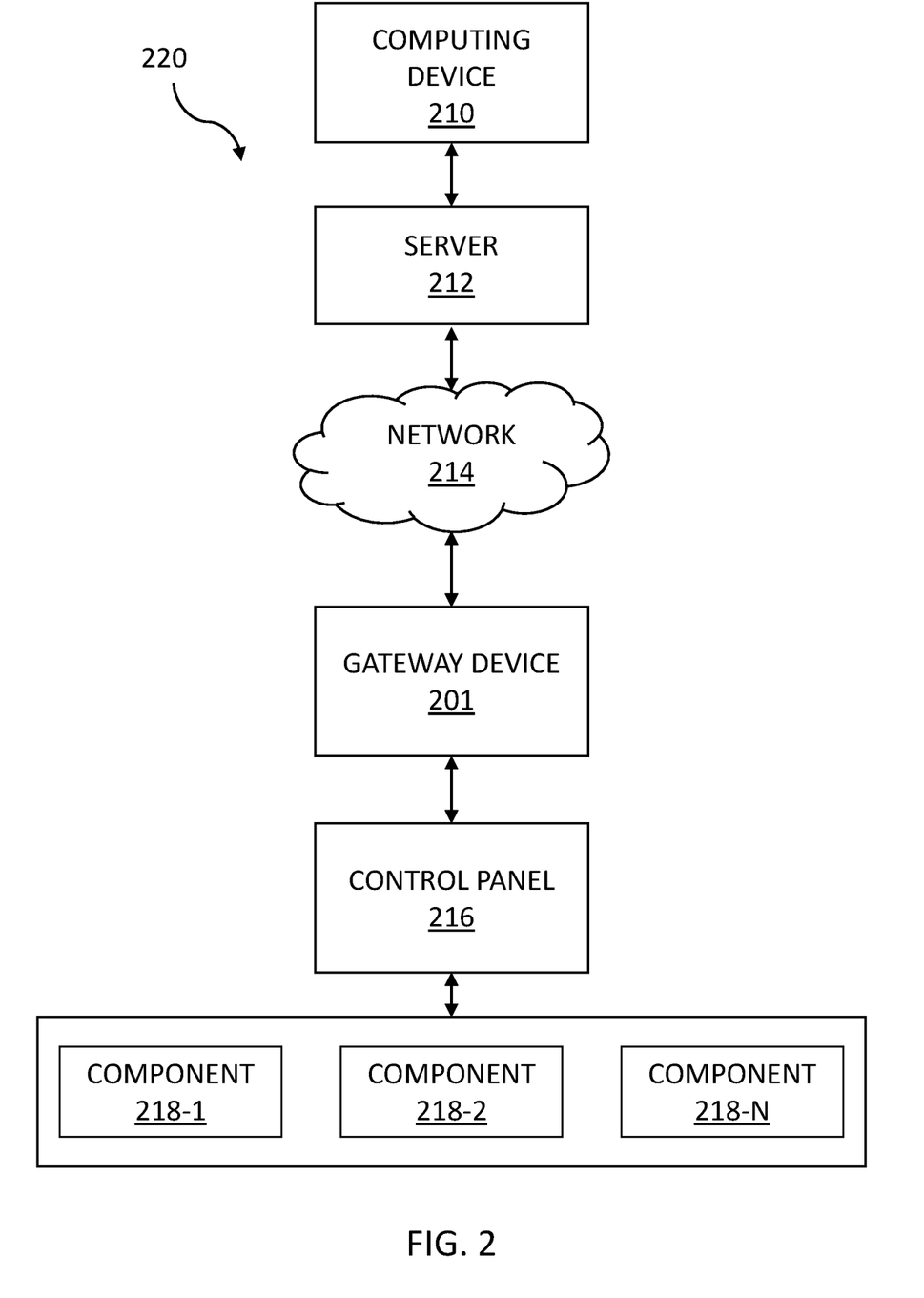
FIG. 2 illustrates an example of a fire control system in accordance with an embodiment of the present disclosure.

Gateway device 101 can communicate with the server which will be further described herein (e.g., in connection with FIG. 2). For instance, engine 106-2 can receive data stored within the server, where the data include data associated with the fire control system and/or data indicating the type of the network interface connected to the network. Such data can be saved within the server. The data received from the server, along with the data received from engine 106-3 can be input into engine 106-2, and used by engine 106-2, to determine a data management scheme that utilizes the available bandwidth as optimally as possible while ensuring a QoS for higher priority cloud services a user has subscribed to.

For example, in a scenario where a user has a cellular network, with 10 megabytes (MB) of monthly data, and has subscribed to a facility management service, data associated with each of these elements can be input into engine 106-2 and a data management scheme can be determined based on these inputs. A feature of the facility management service can include firmware upgrades, which requires 40 MB to execute via a cellular network. Thus, in a scenario such as this, engine 106-2 can determine that there is not enough available bandwidth and firmware upgrades will have to be performed manually by a technician having to visit the site.

Another feature of the facility management service can include device obscuration and sensitivity querying, where device obscuration and sensitivity levels are transferred to the cloud for continuous monitoring and abnormality detection. Based on the received data and the type of detected network interface, engine 106-2 can determine a behavior of the device obscuration and sensitivity querying feature. For example, if 106-3 detects an ethernet interface, data will be transferred once a day. However, if 106-3 detects a cellular interface, data will be transferred only when there is a detected change from previously transferred data.

Engine 106-2 can determine a data management scheme comprising the behavior of each feature of the subscribed-to services based on data associated with the subscribed-to services, network carrier, available bandwidth, and QoS, among other data associated with the operation of the fire control system and the subscribed-to services. The behavior of each feature utilizes the available bandwidth as optimally as possible while ensuring a QoS for higher priority cloud services a user has subscribed to.

Upon determining the data management scheme, gateway 201 can notify the user of the determined data management scheme. The users can be notified though a computing device, such as, for instance, through a mobile device application or web application of their computing device, receiving the notification. The notification can include details about the data management scheme, including, for example, information indicating how to utilize the available bandwidth and the behavior of each feature of the subscribed-to services.

FIG. 2 illustrates an example of a fire control system 220 in accordance with an embodiment of the present disclosure. Fire control system 220 can be, for instance, the fire control system previously described in connection with FIG. 1. For example, as shown in FIG. 2, fire control system 220 can include gateway device 201, which can be gateway device 101 previously described in connection with FIG. 1.

As shown in FIG. 2, fire control system 220 can include a plurality of components 218-1, 218-2, ... 218-N located throughout a facility (e.g., on different floors of the facility) that can be used to detect and/or manage a fire occurring in the facility, and/or to prevent a fire from occurring in the facility. For example, components 218-1, 218-2, ... 218-N may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components.

As shown in FIG. 2, fire control system 220 can include a control panel (e.g., fire control panel) 216. Control panel 216 can be any different type of physical control panel, such as a control box, installed in the facility.

Control panel 216 can be used by a user to monitor and/or control components 218-1, 218-2, ... 218-N. For instance, the user can use control panel 216 to directly control the operation of (e.g., actions performed by) components 218-1, 218-2, ... 218-N. Further, control panel 216 can receive (e.g., collect) data, such as, for instance, real-time operational data, associated with components 218-1, 218-2, ... 218-N. For instance, control panel 216 can receive the data directly from components 218-1, 218-2, ... 218-N. Such data can include, for instance, current operational statuses, operational states, and/or properties of components 218-1, 218-2, ... 218-N.

Gateway device 201 can be used by a user (e.g., maintenance technician or operator) to perform inspections, maintenance, and/or upgrades, among other operations, on components 218-1, 218-2, ... 218-N. For example, as previously described herein (e.g., in connection with FIG. 1), gateway device 201 can be connected to control panel 216, and can communicate with control panel 216 to receive the data associated with components 218-1, 218-2, ... 218-N collected by control panel 216. For instance, gateway device 201 can detect connectivity to control panel 216, determine which type of interface is connected to control panel 216, and communicate with control panel 216 based on the type of connected interface, as previously described herein (e.g., in connection with FIG. 1). As an additional example, gateway device 201 may be permanently installed and/or connected at the facility, such that it can continuously send (e.g., push) the data collected by control panel 216 to server 212.

As shown in FIG. 2, fire control system 220 can include a server 212. Server 212 can be located remotely from the facility and, in some embodiments, can be part of and/or coupled to a computing device (e.g., computing device 210 illustrated in FIG. 2) that is part of a centralized management platform.

Gateway device 201 can communicate with server 212 via network 214, as illustrated in FIG. 2. For example, as previously described herein (e.g., in connection with FIG. 1), gateway device 201 can detect connectivity to network 214, and send (e.g., transmit and/or upload) data to server 212 via network 214 using the network interface detected to be connected to network 214.

Network 214 can be a network relationship through which gateway device 201 and server 212 can communicate. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, network 214 can include a number of servers that receive information from, and transmit information to, gateway device 201 and server 212 via a wired or wireless network.

As used herein, a "network" can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As used herein, the term "cloud", or distributed control network, can be used to refer to a server and/or computing device working in conjunction with other computing resources (hardware, software, logic, memory, processor, etc.) that can be used as a service over a communications network (in a wired and/or wireless manner over the internet). The server, computing device, and other computing resources can all be referred to as being part of the "cloud".

As used herein, the term "computing device" can include a laptop computer, desktop computer, or mobile device, such as, for instance, a smart phone or tablet, among other types of computing devices. The computing device can include a user interface. A user can interact with the computing device via the user interface. For example, the user interface can provide (e.g., display) information to and/or receive information from (e.g., input by) the user of the computing device.

In some embodiments, user interface can be a graphical user interface (GUI) that can include a display (e.g., a screen) that can provide information to, and/or receive information from, the user of the computing device. The display can be, for instance, a touch-screen (e.g., the GUI can include touch-screen capabilities). As an additional example, the user interface can include a keyboard and/or mouse that the user can use to input information into the computing device, and/or a speaker that can play audio to, and/or receive audio (e.g., voice input) from, the user. Embodiments of the present disclosure, however, are not limited to a particular type(s) of user interface.

Figure 3:
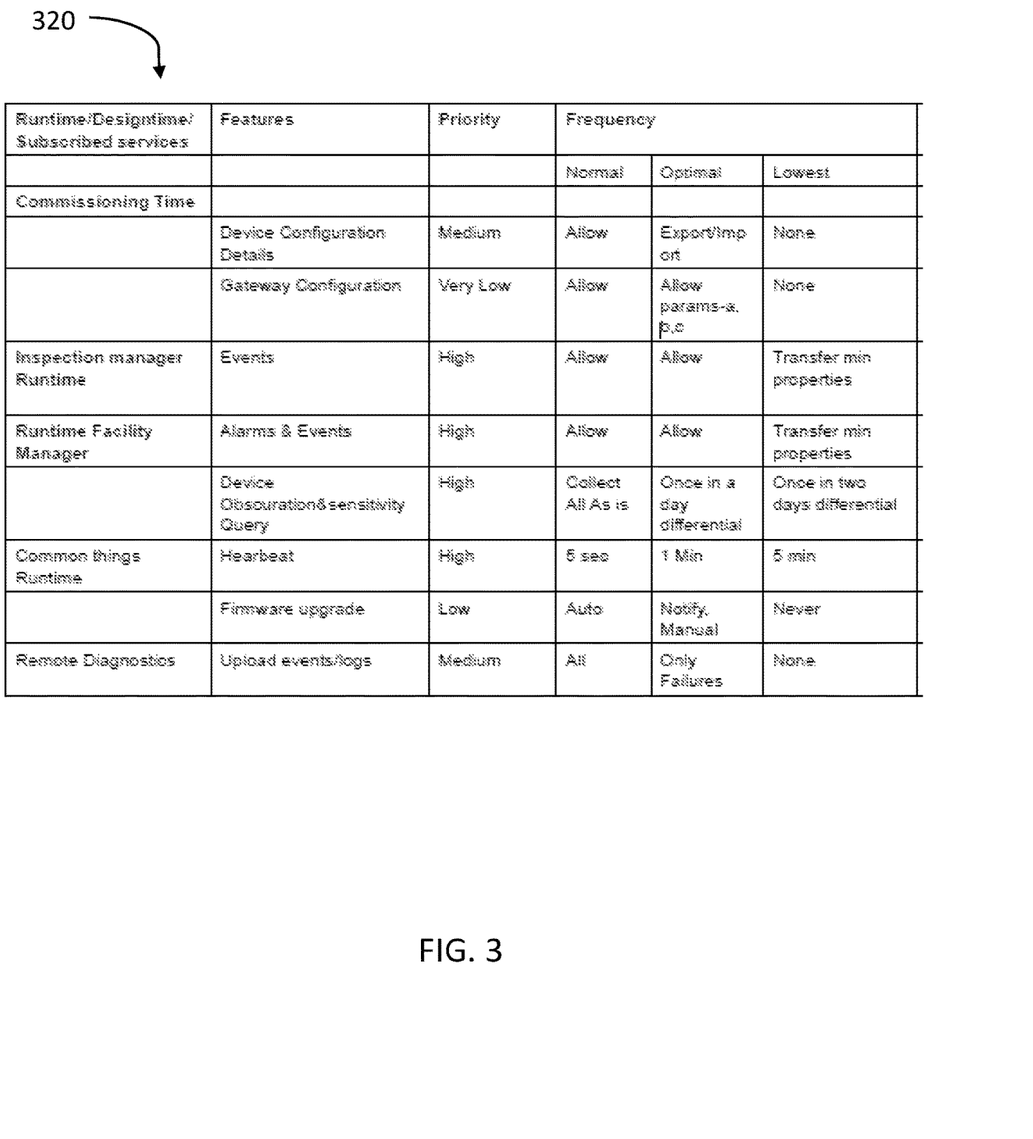
FIG. 3 illustrates a table associated with operating a gateway device in accordance with an embodiment of the present disclosure.

FIG. 3 illustrates a table 320 associated with operating a gateway device (e.g., gateway device 101 and/or 201 previously described in connection with FIGS. 1 and 2, respectively), in accordance with an embodiment of the present disclosure. Table 320 can include data associated with the subscribed-to cloud services, such as the selected features, as previously described herein (e.g., in connection to FIG. 1).

Upon subscribing to a number of cloud services, a user can select a number of features which correspond to each of the subscribed-to services. For example, as shown in FIG. 3, a user can subscribe to a Runtime Facility Manager service. Upon subscribing to the Runtime Facility Manager service, the user may also select a number of features that correspond to the Runtime Facility Manager service. As shown in FIG. 3, the user may select an "Alarms and Events" feature and a "Device Obscuration & Sensitivity Query" feature.

Additional cloud services the user can subscribe to, as shown in FIG. 3, can include a Commissioning Time service, an Inspection Manager Runtime service, a Common Things Runtime service, and a Remote Diagnostics service. Upon subscribing to any one of these cloud services, the user can select a number of features that correspond to the subscribed-to service. For example, upon subscribing to a Commissioning Time service, the user may select a "Device Configuration Details" feature and/or a "Gateway Configuration" feature. Upon subscribing to an Inspection Manager Runtime service, the user may select a "Events" feature. Upon subscribing to a Common Things Runtime service, the user may select a "Heartbeat" feature and/or a "Firmware Upgrade" feature. Upon subscribing to a Remote Diagnostics service, the user may select a "Remote Diagnostics" feature. The subscribed-to services and selected features are not limited to those shown in FIG. 3.

As shown in FIG. 3, the user may also prioritize each of the selected features. For example, the user may assign each selected feature with a priority level of very low, low, medium, high, and very high. Additionally, information relating to the behavior of each feature can be associated with each feature. For instance, the behavior of each feature may correspond to a configured frequency, as shown in FIG. 3. Upon subscribing to cloud services and selecting a number of features, a user can configure a number of behaviors which can correspond to each feature. Each feature can have what is classified as a "normal" behavior, a "optimal" behavior, and a "lowest" behavior. The classified behavior of a feature may depend on the priority of the feature, along with additional data such as the available bandwidth and detected network interface, among other data.

For example, in a scenario where a user has a cellular network, with 10 megabytes (MB) of monthly data, and has subscribed to a runtime facility manager service and a commissioning time service, data associated with each of these elements can be received by the gateway and a data management scheme can be determined. As shown in FIG. 3, a feature of the commissioning time service can include gateway configuration, which has been assigned a very low priority. Additionally, a feature of the runtime facility manager service can include alarms and events, which has been assigned a high priority.

In such an example, the gateway device can determine a data management scheme that utilizes the available bandwidth as optimally as possible while ensuring a QoS for higher priority cloud services the user has subscribed to. The data management scheme can utilize the available bandwidth in a way which gives higher priority to the alarms and events feature than the commissioning time feature. Thus, if there is a limited amount of bandwidth available, the behavior of the alarms and events feature may correspond to a behavior classified as "optimal", while the behavior of the commissioning time feature may correspond to a behavior classified as "lowest".

Figure 4:
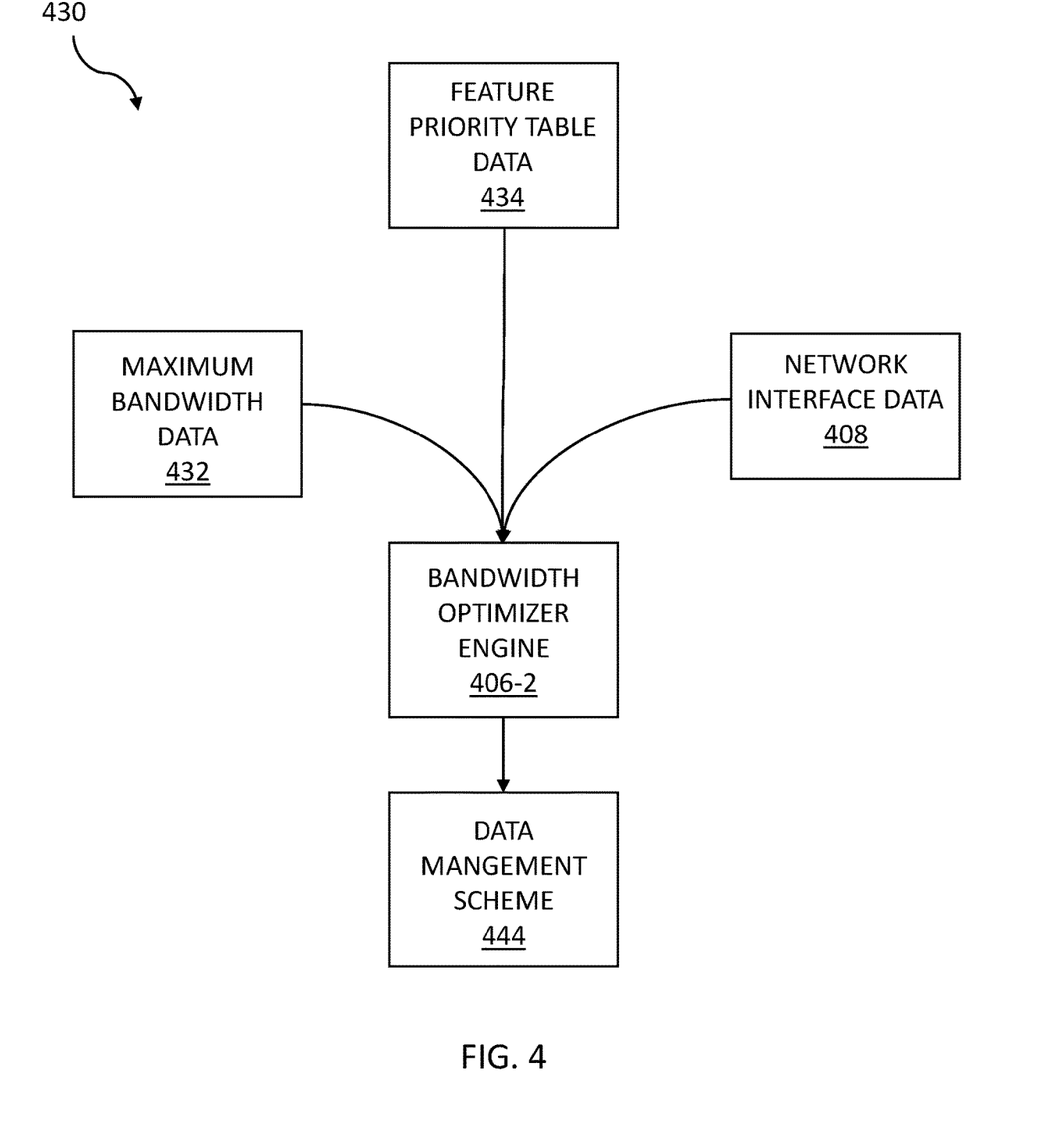
FIG. 4 illustrates a flow chart associated with operating a gateway device in accordance with an embodiment of the present disclosure.

FIG. 4 illustrates a flow chart 430 associated with operating a gateway device in accordance with an embodiment of the present disclosure. The gateway device can be gateway device 101 previously described in connection with FIG. 1 and/or gateway device 201 previously described in connection with FIG. 2. As previously described herein (e.g., in connection with FIG. 1), the gateway device can include bandwidth optimizer engine 406-2, which may be referred to engine as 406-2.

As previously described, engine 406-2 can determine a data management scheme 444 that utilizes the available bandwidth as optimally as possible while ensuring a QoS for higher priority cloud services a customer has subscribed to. The data management scheme 444 can be determined based on received data 432, 434, and 408.

As shown in FIG. 4, maximum bandwidth data 432 can include data associated with a maximum amount of available bandwidth that can be utilized by the gateway device, such 10 MB of monthly data. Feature priority table data 434 can include data associated with the subscribed-to cloud services, as previously described (e.g., in connection with table 320 shown in FIG. 3). Network interface data 408 can include data associated with (e.g., the type of) the detected network interface, as previously described (e.g., in connection with FIG. 1).

For example, bandwidth optimizer engine 406-2 can determine that in a scenario where the user has a cellular network (e.g., 4G/LTE) with 10 MB of monthly data, and has subscribed to a common things runtime service that includes a firmware upgrade which has been assigned a low priority, that firmware upgrades will be manually performed. Bandwidth optimizer engine 406-2 can determine the behavior of each of the selected features to make up the data management scheme 444.

Figure 5:
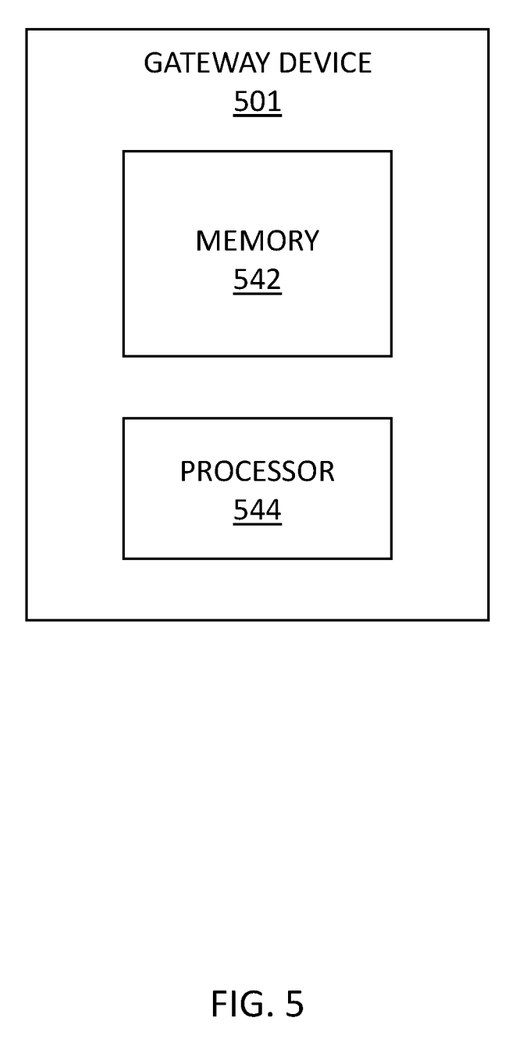
FIG. 5 illustrates an example of a gateway device for a fire control system in accordance with an embodiment of the present disclosure.

FIG. 5 illustrates an example of a gateway device 501 for a fire control system in accordance with an embodiment of the present disclosure. Gateway device 501 can be, for instance, gateway device 101 and/or gateway device 201 previously described herein in connection with FIGS. 1 and 2, respectively.

As shown in FIG. 5, gateway device 501 can include a processor 544 and a memory 542. Memory 542 can be any type of storage medium that can be accessed by processor 544 to perform various examples of the present disclosure. For example, memory 542 can be a non-transitory computer readable medium having computer readable instructions (e.g., computer program instructions) stored thereon that are executable by processor 544 to perform various examples of the present disclosure. That is, processor 544 can execute the executable instructions stored in memory 542 to perform various examples in accordance with the present disclosure.

Memory 542 can be volatile or nonvolatile memory. Memory 652 can also be removable (e.g., portable) memory, or non-removable (e.g., internal) memory. For example, memory 542 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EE-PROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 542 is illustrated as being located in gateway device 501, embodiments of the present disclosure are not so limited. For example, memory 542 can also be located internal to another computing resource (e.g., enabling computer readable instructions to be downloaded over the Internet or another wired or wireless connection).

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A gateway device for a fire control system, comprising:
a processor; and
a memory having instructions stored thereon which, when executed by the processor, cause the processor to:
detect that a network interface of the gateway device is connected to a network;
receive data associated with the fire control system; and
determine a data management scheme for the gateway device based on a type of detected network interface and the received data.

2. The gateway device of claim 1, wherein the gateway device includes an interface scanning engine configured to detect that one of a plurality of control panel interfaces is connected to a fire control panel of the fire control system.

3. The gateway device of claim 1, wherein the gateway device includes a bandwidth optimizer engine configured to receive data associated with the fire control system and the type of detected network interface to determine the data management scheme for the gateway device.

4. The gateway device of claim 1, wherein the gateway device includes a network connector engine configured to detect that one of a plurality of network interfaces is connected to the network.

5. The gateway device of claim 1, wherein the data associated with the fire control system includes maximum bandwidth data.

6. The gateway device of claim 1, wherein the data associated with the fire control system includes a feature priority table data.

7. The gateway device of claim 6, wherein the feature priority table data includes information associated with cloud services a user has subscribed to.

8. The gateway device of claim 1, wherein the data management scheme is associated with a number of cloud services subscribed to by a user.

9. The gateway device of claim 1, wherein the data management scheme facilitates how available bandwidth is utilized by the gateway device for a particular feature of a subscribed-to cloud service while ensuring a quality of service (QoS) for the particular feature.

10. A method of operating a gateway device for a fire control system, comprising:
detecting, by the gateway device, that a network interface of the gateway device is connected to a network;
receiving, by the gateway device, data associated with a fire control system;
receiving, by the gateway device, a selection of a feature associated with a cloud service for the fire control system; and
determining, by the gateway device, a data management scheme for the selected feature based on a type of detected network interface and the received data.

11. The method of claim 10, wherein detecting that the network interface is connected to the network includes scanning each of a plurality of network interfaces of the gateway device to determine which of the plurality of network interfaces is connected to the network.

12. The method of claim 11, wherein the plurality of network interfaces include:
an ethernet interface;
a Wi-Fi interface;
a long-term evolution (LTE) interface; and
a public switched telephone network (PSTN) interface.

13. The method of claim 11, wherein the method includes notifying a user of the determined data management scheme.

14. The method of claim 13, wherein notifying the user of the determined data management scheme includes notifying the user of details about the data management scheme, including, information indicating how to utilize an available bandwidth.

15. A fire control system, comprising:
a control panel;
a server configured to connect to a network; and
a gateway device configured to connect to an interface of the control panel and configured to:
 detect that one of a plurality of network interfaces of the gateway device is connected to the network;
 receive data associated with the fire control system;
 receive a selection of a feature associated with a cloud service for the fire control system;
 determine a data management scheme for the selected feature based on the detected network interface and the received data; and
 notify a user of the determined data management scheme.

16. The system of claim 15, wherein the gateway device is configured to receive the operational data via one of:
an ethernet interface of the gateway device;
a universal serial bus (USB) interface of the gateway device;
a recommended standard (RS) interface of the gateway device; and
a transistor-transistor logic (TTL) interface of the gateway device.

17. The system of claim 15, wherein the gateway device is configured to communicate with the server via the detected one of the plurality of network interfaces connected to the network.

18. The system of claim 15, wherein the gateway device is configured to detect that the one of the plurality of network interfaces is connected to the network by scanning each respective one of the plurality of network interfaces until connectivity of one of the plurality of network interfaces is detected.

19. The system of claim 15, wherein the gateway device is configured to detect that the one of the plurality of the network interfaces is connected to the network upon a powering on of the gateway device.

20. The system of claim 15, wherein the control panel and the gateway device are installed in a facility, and wherein the server is located remotely from the facility.

* * * * *